(12) United States Patent
Kawai et al.

(10) Patent No.: US 8,199,200 B2
(45) Date of Patent: Jun. 12, 2012

(54) PHOTOGRAPHING DEVICE PROVIDED WITH DUST REMOVING MECHANISM

(75) Inventors: Sumio Kawai, Hachioji (JP); Junichi Ito, Fuchu (JP); Hiroyuki Takizawa, Chofu (JP)

(73) Assignee: Olympus Corporation, Tokyo (JP)

( * ) Notice: Subject to any disclaimer, the term of this patent is extended or adjusted under 35 U.S.C. 154(b) by 1111 days.

(21) Appl. No.: 10/780,440

(22) Filed: Feb. 17, 2004

(65) Prior Publication Data

US 2004/0169761 A1    Sep. 2, 2004

Related U.S. Application Data

(63) Continuation of application No. PCT/JP03/05789, filed on May 8, 2003.

(30) Foreign Application Priority Data

May 13, 2002   (JP) ................................ 2002-137675

(51) Int. Cl.
*H04N 3/08*   (2006.01)
(52) U.S. Cl. ........ 348/205; 348/335; 348/340; 348/373; 348/374; 348/351
(58) Field of Classification Search .................. 348/205, 348/335, 340, 373, 374, 351
See application file for complete search history.

(56) References Cited

U.S. PATENT DOCUMENTS

| | | | |
|---|---|---|---|
| 4,387,973 A | | 6/1983 | Martin |
| 4,841,387 A | | 6/1989 | Rindfuss |
| 4,920,420 A | | 4/1990 | Sano et al. |
| 5,170,288 A | * | 12/1992 | Imaizumi et al. ............. 359/507 |
| 5,781,236 A | * | 7/1998 | Shinbori et al. ............. 348/342 |
| 5,910,700 A | | 6/1999 | Crotzer |
| 5,920,144 A | * | 7/1999 | Atsuta ..................... 310/316.02 |
| 6,078,438 A | | 6/2000 | Shibata et al. |
| 6,163,340 A | | 12/2000 | Yasuda |
| 6,590,613 B2 | | 7/2003 | Yasuda |
| 2001/0026112 A1 | * | 10/2001 | Yoshida et al. ............... 310/328 |
| 2001/0053288 A1 | | 12/2001 | Ito et al. |
| 2002/0171751 A1 | | 11/2002 | Ohkawara |
| 2003/0146980 A1 | | 8/2003 | Shimada |
| 2003/0202114 A1 | | 10/2003 | Takizawa et al. |
| 2003/0214588 A1 | | 11/2003 | Takizawa et al. |
| 2003/0214599 A1 | | 11/2003 | Ito et al. |
| 2003/0218685 A1 | | 11/2003 | Kawai |
| 2004/0012714 A1 | * | 1/2004 | Kawai .......................... 348/374 |
| 2004/0047625 A1 | | 3/2004 | Ito et al. |
| 2004/0090549 A1 | | 5/2004 | Takizawa et al. |
| 2004/0169761 A1 | | 9/2004 | Kawai et al. |
| 2004/0227837 A1 | | 11/2004 | Ito |
| 2004/0263669 A1 | | 12/2004 | Kobayashi |

(Continued)

FOREIGN PATENT DOCUMENTS

JP          57-078032          5/1982

(Continued)

*Primary Examiner* — Yogesh Aggarwal
(74) *Attorney, Agent, or Firm* — John C. Pokotylo; Straub & Pokotylo

(57) ABSTRACT

A camera according to this invention comprises a photographing optical system which forms an optical image of an object, a photoelectric conversion element which converts the optical image into an electric signal, an optical element arranged between the photographing optical system and the photoelectric conversion element, and vibration means which vibrates the optical element first at one of at least two frequencies and then at the other frequency, the frequencies being close to resonance frequencies.

12 Claims, 9 Drawing Sheets

U.S. PATENT DOCUMENTS

2005/0088563 A1    4/2005    Ito et al.

FOREIGN PATENT DOCUMENTS

| | | |
|---|---|---|
| JP | 62-165127 | 7/1987 |
| JP | 01-230016 | 9/1989 |
| JP | 03-244281 | 10/1991 |
| JP | 05-213286 | 8/1993 |
| JP | 07-151946 | 6/1995 |
| JP | 07-322153 | 12/1995 |
| JP | 08-079633 | 3/1996 |
| JP | 8-79633 | 3/1996 |
| JP | 08079633 A * | 3/1996 |
| JP | 9-130654 | 5/1997 |
| JP | 09-130654 | 5/1997 |
| JP | 2000-29132 | 1/2000 |
| JP | 2000-029132 | 1/2000 |
| JP | 2000-330054 | 11/2000 |
| JP | 2001-298640 | 10/2001 |
| JP | 2001-359287 | 12/2001 |
| JP | 2002-10137 | 1/2002 |
| JP | 2002-204379 | 7/2002 |
| JP | 2002-229110 | 8/2002 |

* cited by examiner

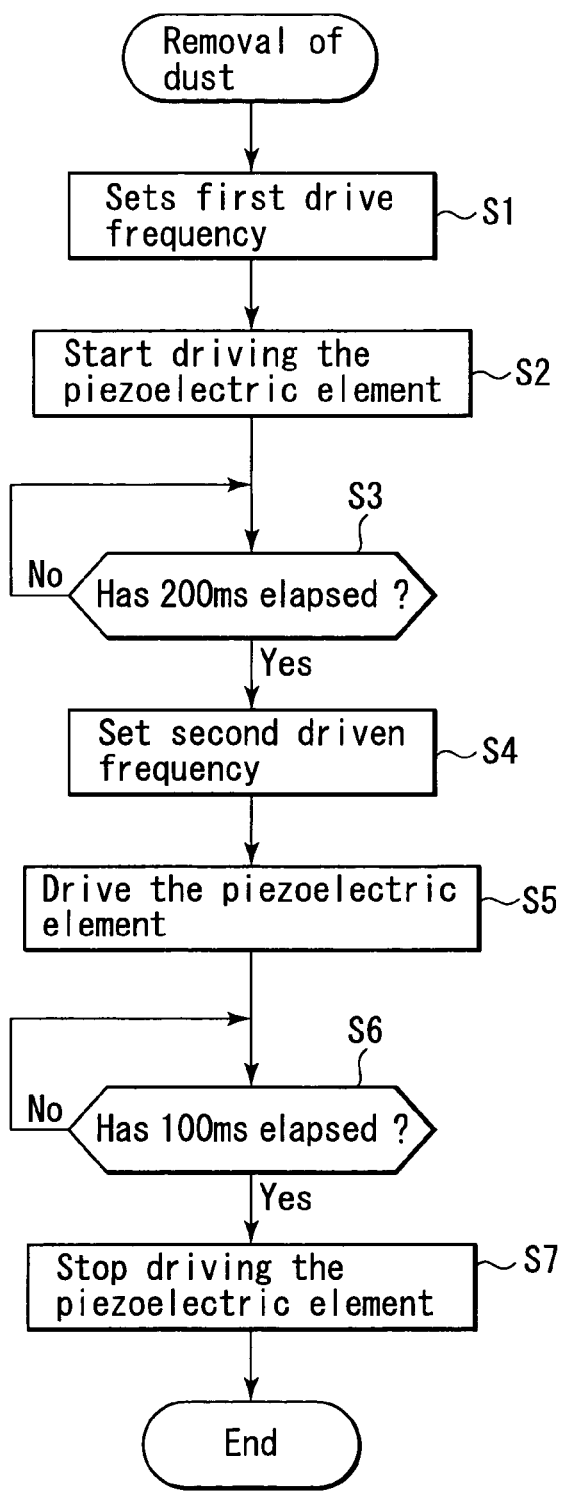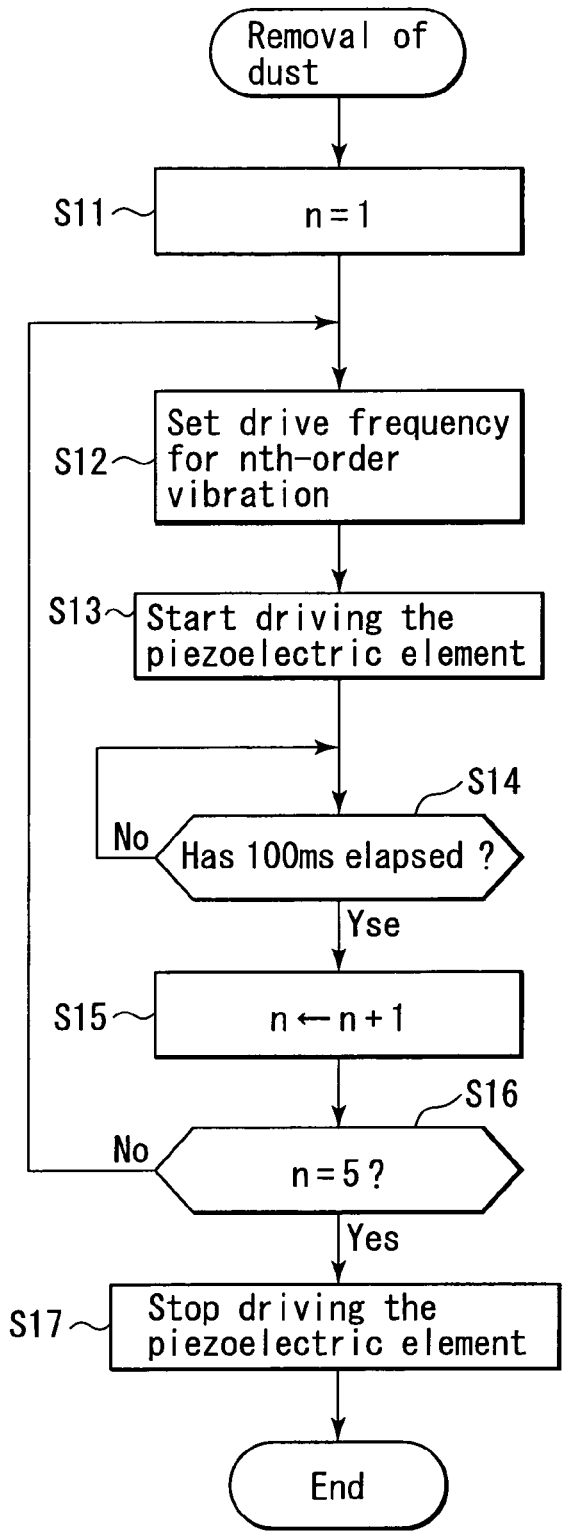
FIG. 12
FIG. 13

PHOTOGRAPHING DEVICE PROVIDED WITH DUST REMOVING MECHANISM

CROSS-REFERENCE TO RELATED APPLICATIONS

This is a Continuation Application of PCT Application No. PCT/JP03/05789, filed May 8, 2003, which was not published under PCT Article 21(2) in English.

This application is based upon and claims the benefit of priority from the prior Japanese Patent Application No. 2002-137675, filed May 13, 2002, the entire contents of which are incorporated herein by reference.

BACKGROUND OF THE INVENTION

1. Field of the Invention

The present invention relates to a camera with an imaging-element unit that has an imaging element for obtaining image signals corresponding to the light applied to its photoelectric conversion surface. The invention relates to, for example, an improvement to a camera such as a single-lens reflex, digital camera in which lenses can be replaced.

2. Description of the Related Art

In recent years, digital cameras and the like (hereinafter called "digital cameras" or "cameras"), such as so-called digital still cameras and so-called digital video cameras, have come into general and wide use. The digital cameras have the following structure.

In the digital camera, the light beam reflected from an object and passing through the optical system (hereinafter referred to as "object light beam") defines an image of the object. The image of the object is focused on the photoelectric conversion surface of a solid-state imaging element or the like that is arranged at a prescribed position. The solid-state imaging element is, for example, a charge coupled device (CCD, hereinafter referred to as "imaging element"). The imaging element performs photoelectric conversion, generating an electric image signal that represents a desired image of the object.

A signal based on the image signal is output to a display device such as a liquid crystal display (LCD). The display device displays the image that corresponds to the image signal. The image signal generated by the imaging element is recorded as image data in a predetermined region of a specific recording medium. The image data recorded in the recording medium is read and converted to image data that is optimal for the display device to display the image. Using the image signal thus converted, the display device displays the image corresponding to the signal.

Ordinary digital cameras have an optical finder device. Through the finder device the user observes a desired object in order to set a photographing field in which the object is seen, before he or she take a picture of the object.

The optical finder device is configured as follows. When the user views the object, the reflecting member is located on the optical axis of the photographing optical system. Thus located, the reflecting member reflects the object light beam. The object light beam is guided to a predetermined position, where an image of the object is formed so that the user may observe it. To photograph the object, the reflecting member is moved away from the optical axis of the photographing optical system. As a result, the object light beam is guided to the light-receiving surface of the imaging element, or the photoelectric conversion surface. An image of the object, which is to be photographed, is thereby formed on the photoelectric conversion surface. The finder device of this configuration is called "single-lens reflex type" and is generally used.

In recent years, digital cameras have come into general use. They comprise a finder device of the single-lens reflex type and whose photographing optical system can be removed from the camera body. With a digital camera of this type, the user can replace the lenses with others. The user can therefore use any selected one of various types of photographing optical systems, in the same camera body.

In the case of such a lens-replaceable digital camera, dust and the like floating in air may enter the camera body when the photographing optical system is removed from the camera body. The camera body contains a shutter mechanism, a diaphragm mechanism and the like, which are mechanically driven. When driven, these mechanisms may form dust in some cases.

When the photographing optical system is removed from the camera body, the light-receiving surface (also called "photoelectric conversion surface") of the imaging element, which is arranged at the back of the photographing optical system, is exposed to air in the camera body. Dust may therefore stick onto the photoelectric conversion surface of the imaging element due to electrical charging or the like.

There has been proposed the technique that inhibits dust and the like from sticking to the light-receiving surface of the imaging element used in a conventional single-lens reflex digital camera, despite electrical charging. Such a technique is disclosed in, for example, Jpn. Pat. Appln. KOKAI Publication No. 2000-29132.

The technique disclosed in Jpn. Pat. Appln. KOKAI Publication No. 2000-29132 is to provide a transparent electrode on the cover that covers the light-receiving surface of the imaging element that is incorporated in a lens-replaceable, single-lens reflex digital camera. A DC voltage or AC voltage of about several kilohertz to 20 kHz is applied to this electrode, thereby to prevent dust and the like from sticking to the light-receiving surface of the imaging element, in spite of electrical charging.

According to the publication, the electric charge generated in the imaging element is neutralized to inhibit dust and the like from sticking to the light-receiving surface of the imaging element, despite static electricity.

Most imaging elements widely used in the conventional digital cameras are elements that are sealed in packages (called "packaged CCDs" for example). In recent years it has been proposed that so-called "bare-chip CCDs," or bare CCD chips, be supplied to the market, along with the packaged imaging elements.

Dust and the like are more likely to stick to the photoelectric-conversion surface of the bare-chip CCD. In view of this, it is proposed that a piezoelectric element be interposed between the bare-chip CCD and the substrate supporting the bare-chip CCD. A voltage is applied to the piezoelectric element, vibrating the bare-chip CCD and causing the dust and the like to fall off the bare-chip CCD. This technique is disclosed in, for example, Jpn. Pat. Appln. KOKAI Publication No. 9-130654.

The applicant hereof has filed Japanese Patent Application No. 2000-401291. In the application, the applicant proposes that a dust-shielding member and a vibrating means be provided. The dust-shielding member covers and protects the photoelectric conversion surface of an imaging element, thus inhibiting dust and like from sticking to the photoelectric conversion surface of the imaging element. The vibrating means vibrates the dust-shielding member to make dust and the like fall from the dust-shielding member.

This technique can inhibit dust and the like from sticking to the photoelectric conversion surface of an imaging element by the use of a small and simple mechanism. The technique can also provide a lens-replaceable digital camera in which dust and the like can be easily removed from the dust-shielding member.

Particles of the dust and the like that stick to the surface of the dust-shielding member varies in side and weight. Thus, the dust-shielding member is vibrated not only in a single mode, but also in various modes by changing vibration frequency and amplitude, thereby removing the dust and the like with higher efficiency.

BRIEF SUMMARY OF THE INVENTION

According to a first aspect of the invention there is provided a camera that comprises:

a photographing optical system which forms an optical image of an object;

a photoelectric conversion element which converts the optical image into an electric signal;

an optical element arranged between the photographing optical system and the photoelectric conversion element; and vibration means which vibrates the optical element first at one of at least two frequencies and then at the other frequency, the frequencies being close to resonance frequencies.

According to a second aspect of the invention, there is provided a camera which comprises:

a photographing optical system which forms an optical image of an object;

an imaging element which converts the optical image into an electric signal;

a dust filter arranged between the photographing optical system and the imaging element;

a piezoelectric element which vibrates the dust filter;

a drive circuit which drives the piezoelectric element; and a control circuit which outputs control signals for driving and controlling the drive circuit, wherein the control circuit first outputs a control signal for causing the dust filter to undergo a low-order resonance vibration and then a control signal for causing the dust filter to undergo a high-order resonance vibration.

According to a third aspect of this invention, there is provided a camera which comprises:

a photographing optical system which forms an optical image of an object;

an imaging element which converts the optical image into an electric signal;

a dust filter arranged between the photographing optical system and the imaging element;

a piezoelectric element which vibrates the dust filter;

a drive circuit which drives the piezoelectric element; and a control circuit which outputs control signals for driving and controlling the drive circuit, wherein the control circuit first outputs a control signal for causing the dust filter to undergo a high-order resonance vibration and then a control signal for causing the dust filter to undergo a low-order resonance vibration.

According to a fourth aspect of the invention, there is provided a camera which comprises:

a photographing optical system which forms an optical image of an object;

imaging means which converts the optical image into an electric signal;

filter means arranged between the photographing optical system and the imaging means;

vibration means which vibrates the filter means at frequencies close to resonance frequencies of the filter means; and control means which controls at least the vibration means, wherein the control means controls the vibration means such that the order of vibration of the filter means is changed, either increasing or decreasing.

According to a fifth aspect of this invention, there is provided a camera which comprises:

a photographing optical system which forms an optical image of an object;

imaging means which converts the optical image into an electric signal;

an optical element arranged between the photographing optical system and the imaging means;

vibration means which causes the optical element to undergo standing-wave vibration, wherein vibration means vibrates the optical element such that the number of vibration nodes changes with time.

According to a sixth aspect of the present invention, there is provided a camera in which an optical image of an object is formed on a light-receiving surface of an imaging element, via a photographing optical system. This camera is characterized in that a dust filter is arranged in front of the imaging element, the dust filter is vibrated, sequentially at frequencies close to the resonance frequencies of the dust filter, thereby to remove dust and the like from a surface of the dust filter.

BRIEF DESCRIPTION OF THE SEVERAL VIEWS OF THE DRAWING

FIG. 12 is a flowchart explaining a sequence of removing dust in the camera of FIG. 1;

FIG. 13 is a flowchart explaining another, or second sequence of removing dust in the camera of FIG. 1;

DETAILED DESCRIPTION OF THE INVENTION

Embodiments of the present invention will be described, with reference to the accompanying drawings.

Figure 1:
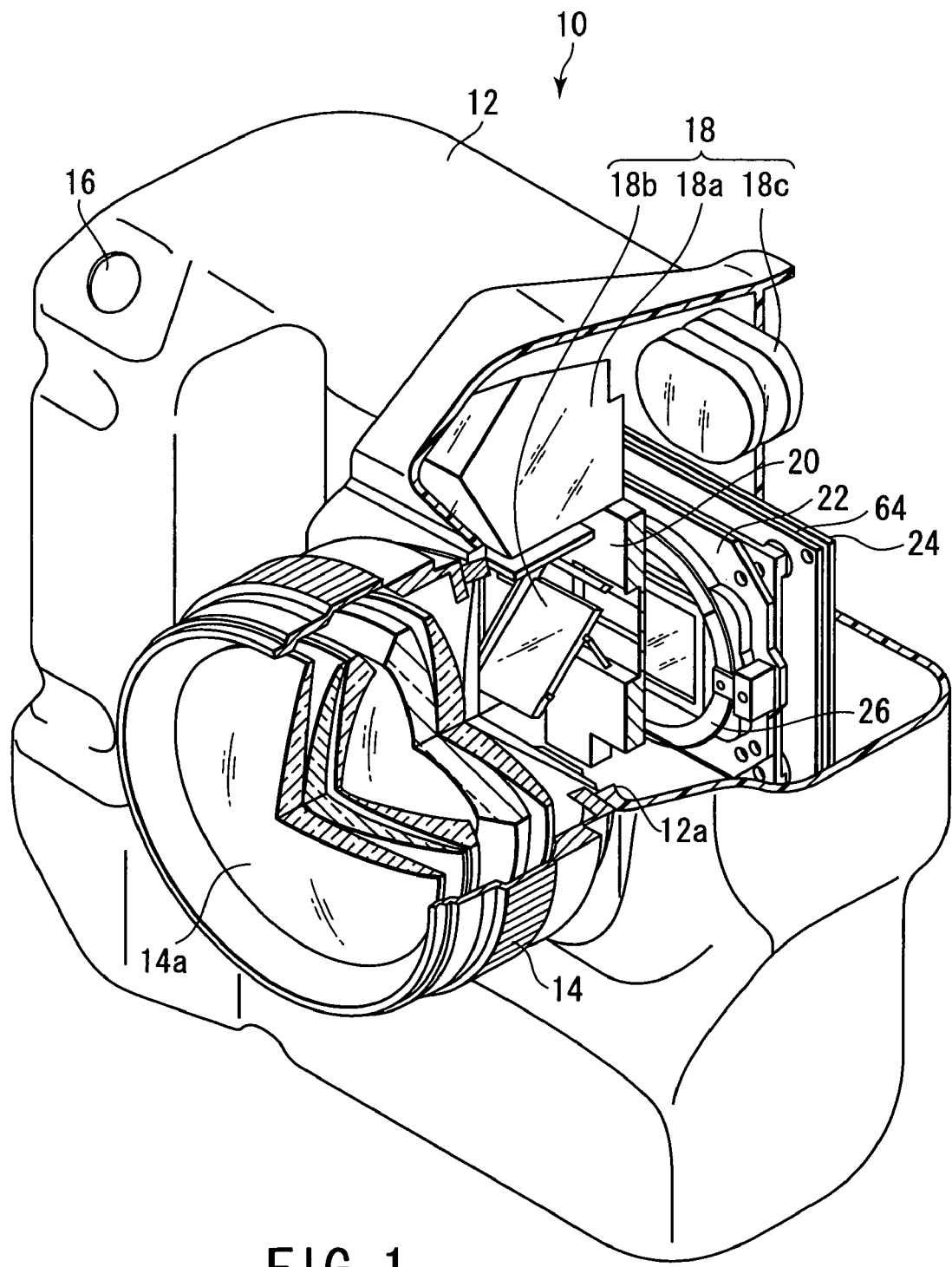
FIG. 1 is a perspective view of a camera according to an embodiment of the invention, showing part of the internal structure of the camera.
Figure 2:
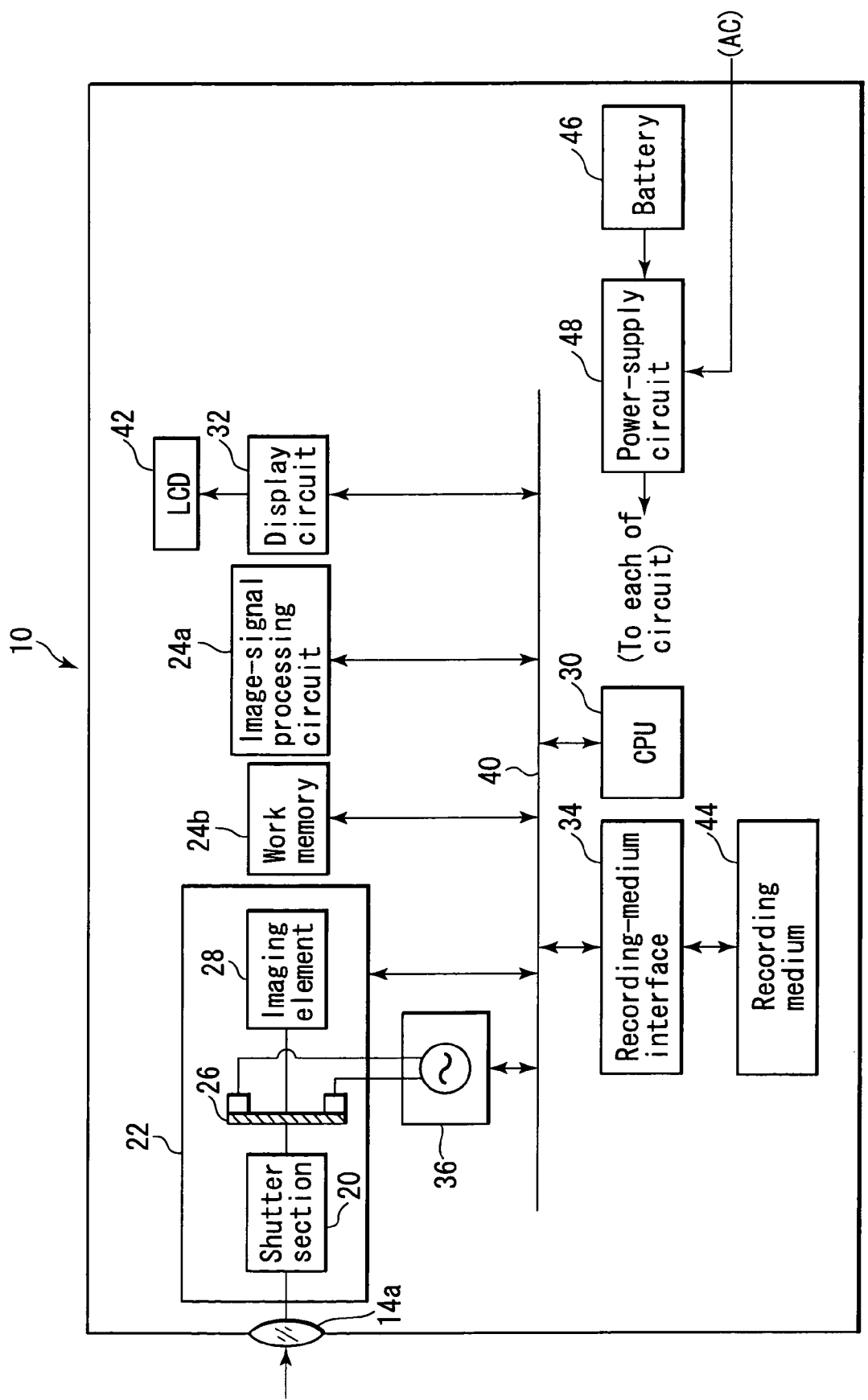
FIG. 2 is a block diagram schematically illustrating mainly the electric configuration of the camera shown in FIG. 1.

FIGS. 1 and 2 are a schematic representation of a camera according to one embodiment of this invention. FIG. 1 is a perspective view of the camera, depicting part of the internal structure of the camera. FIG. 2 is a block diagram schematically illustrating mainly the electric configuration of the camera.

The camera 10 according to the embodiment has a camera main unit 12 and a lens barrel 14 that are discrete components. The camera main unit 12 and the lens barrel 14 are detachably coupled to each other.

The lens barrel 14 contains and holds a photographing optical system 14a that comprises a plurality of lenses, mechanisms for driving the lenses, and the like. The photographing optical system 14a comprises, for example, a plurality of optical lenses and the like. It receives a light beam from an object of photography and focuses the light beam, forming an image of the object at a predetermined position (on the photoelectric conversion surface (light-receiving surface) of an imaging element 28 described later). The lens barrel 14 projects toward the front of the camera main unit 12.

The lens barrel 14 is of the same type as is generally used in the conventional cameras. Its structure will not be described in detail.

The camera main unit 12 incorporates various components. It has a photographing optical system coupler 12a on its front. The coupler 12a holds the photographing optical system. The unit 12 is a so-called single-lens reflex camera. The photographing optical system coupler 12a is a coupling member that holds the lens barrel 14, which can be removed and contains the photographing optical system 14a.

The camera main unit 12 has an exposure opening, which is made in the center part of the front. The exposure opening has a predetermined diameter and can guide the object light beam into the camera main unit 12. The photographing optical system coupler 12a is provided, surrounding the exposure opening.

The photographing optical system coupler 12a is arranged on the outer surface of the camera main unit 12, more precisely on the front of thereof. Various members to be manipulated to operate the camera main unit 12 are arranged on the outer surfaces of the camera main unit 12, more precisely at prescribed positions on the top and back of the unit 12. Among these members is a release button 16 that is pushed to generate a photographing start signal. These members are not directly related to the present invention. Therefore, none of them, but the release button 16, will be shown in the drawings or described, lest the drawings should become complicated.

As FIG. 1 shows, various components such as a finder device 18, a shutter section 20, a photographing unit 22, and a plurality of circuit boards including a main circuit board 24 are arranged at predetermined positions in the camera main unit 12. (Of the circuit boards, only the board 24 is illustrated.)

The finder device 18 is so arranged that the image of an object, which the photographing optical system 14a has formed, may be seen at a prescribed position, not on the photoelectric conversion surface of the imaging element 28 (see FIG. 2) described later. The finder device 18 constitutes a so-called observation optical system.

The shutter section 20 is designed to control the duration of applying the object light beam to the photoelectric conversion surface of the imaging element 28. The section 20 has a shutter mechanism and the like.

The photographing unit 22 is an assembly that comprises the imaging element 28 and a dust filter 26. The dust filter 26 is located at a predetermined position, in front of the photoelectric conversion surface of the imaging element 28. The filter 26 is an optical element and also a member for preventing dust and the like from sticking to the photoelectric conversion surface.

The main circuit board 24 is a plate, on which various electric components are mounted, forming electric circuits. Among these electric circuits is an image-signal processing circuit 24a (see FIG. 2). The circuit 24a performs various processes on the image signal generated by the imaging element 28.

The finder device 18 comprises a pentagonal prism 18a, a reflecting mirror 18b, an ocular lens 18c, and the like. The pentagonal prism 18a receives a light beam from the reflecting mirror 18b and forms an erect real image. The reflecting mirror 18b reflects the axis of the object light beam that has passed through the photographing optical system 14a and guides the same to the observation optical system. The ocular lens 18c focuses the light beam, magnifying the image formed by the pentagonal prism 18a to a size that is optimal for observation.

The reflecting mirror 18b can move between a position where it retreats from the optical axis of the system 14a and a predetermined position on the optical axis thereof. In normal condition the reflecting mirror 18b lies in the optical axis of the photographing optical system 14a, inclined at a predetermined angle, for example 45°, to the optical axis. The reflecting mirror 18b therefore deflects the axis of the object light beam coming through the photographing optical system 14a while the camera 10 remains in the normal condition. That is, the mirror 18b reflects the object light beam to the pentagonal prism 18a that is arranged above the reflecting mirror 18b.

While the camera 10 is photographing the object, the reflecting mirror 18b retreats from the optical axis of the photographing optical system 14a to the predetermined position, during the actual exposure operation. The object light beam is therefore guided to the imaging element 28, illuminating the photoelectric conversion surface of the element 28.

The shutter section 20 is of the type generally used in the conventional cameras. It comprises a shutter mechanism of, for example, focal plane type, and a drive circuit for controlling the shutter mechanism. Therefore, the section 20 will not described in detail.

As indicated above, a plurality of circuit boards are provided in the camera 10, and constitute various electric circuits.

FIG. 2 depicts the electrical configuration of the camera 10. The camera 10 has a CPU 30 that is a control circuit for controlling the entire camera 10. A bus 40 connects the CPU 30 to the photographing unit 22, the image-signal processing circuit 24a, a work memory 24b, a display circuit 32, a recording-medium interface 34, a dust-filter driving section 36 and the like.

The photographing unit 22 includes the shutter section 20. It comprises the imaging element 28 and the dust filter 26. The element 28 is an imaging means for generating an image signal from the object light beam that has passed through the photographing optical system 14a. The image signal generated corresponds to the image of the object.

The image-signal processing circuit 24a is a circuit that performs various processes on the image signal generated by the imaging element 28, such as a process of converting the image signal to one that is fit for recording. The work memory 24b is one that temporarily stores the image signal processed by the image-signal processing circuit 24a, image data, and various information items accompanying the image signal and the image data.

The display circuit 32 electrically connects a display section 42 to the camera 10. The display section 42 comprises a liquid crystal display (LCD) for displaying images and the like. The display circuit 32 is a circuit that receives the image signal processed by the image-signal processing circuit 24a and generates an image signal optimal for the display section 42 to display an image.

The recording-medium interface 34 is configured to connect a recording medium 44 and the electric circuits incorporated in the camera 10. The recording medium 44 has regions for recording image data that the image-signal processing circuit 24a has generated in a prescribed format.

The dust-filter driving section 36 is an electric circuit (drive circuit) that drives a piezoelectric element 54 (later described) in accordance with a control signal output from the CPU 30. When driven, the element 54 vibrates the dust filter 26 incorporated in the photographing unit 22. The dust-filter driving section 36 comprises an oscillator and the like.

The camera 10 has a battery 46 and a power-supply circuit 48. The battery 46 is a secondary one such as a dry cell. The power-supply circuit 48 receives power from the battery 46 or power supplied from an external power supply (AC) via a connection cable or the like (not shown). The circuit 48 controls the power, rendering the power appropriate to operate the camera 10 and supplying the power to the electric circuits.

The photographing unit 22 that is provided in the camera 10 according to this embodiment will be described in detail.

Figure 3:
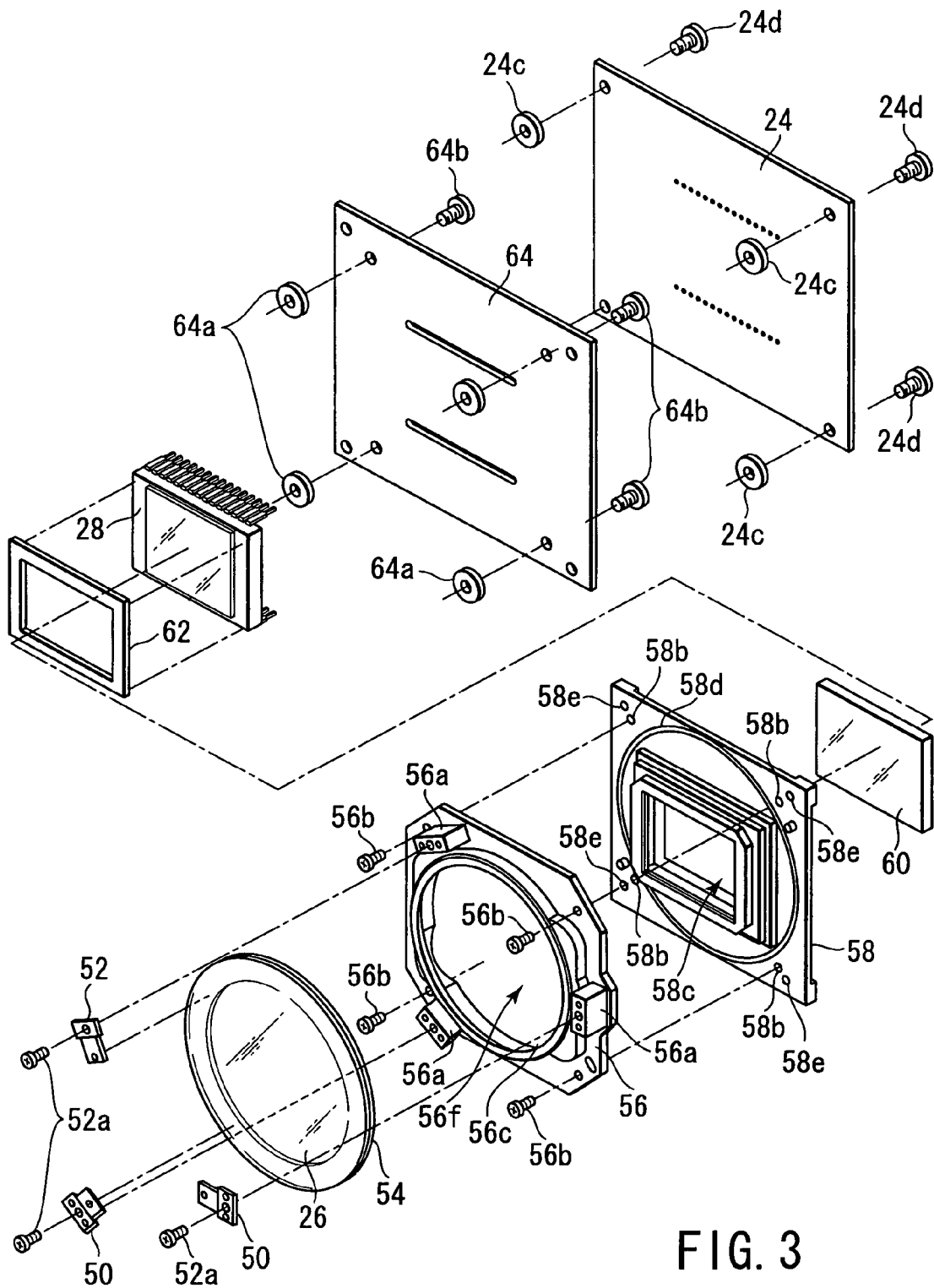
FIG. 3 is an exploded perspective view of the photographing unit provided in the camera shown in FIG. 1, depicting the major components of the unit.
Figure 4:
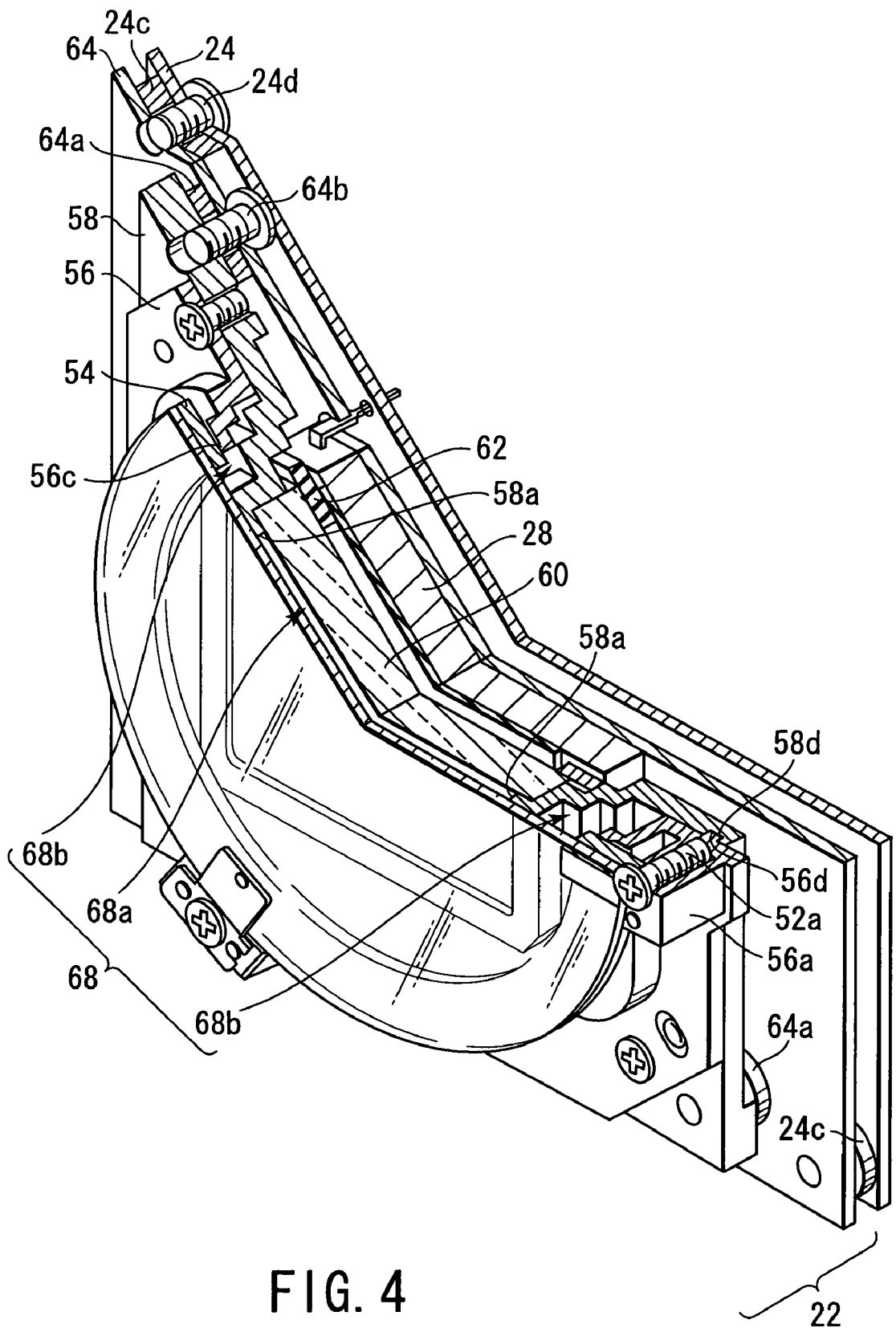
FIG. 4 is a partially sectional, perspective view of the photographing unit assembled and incorporated in the camera of FIG. 1.
Figure 5:
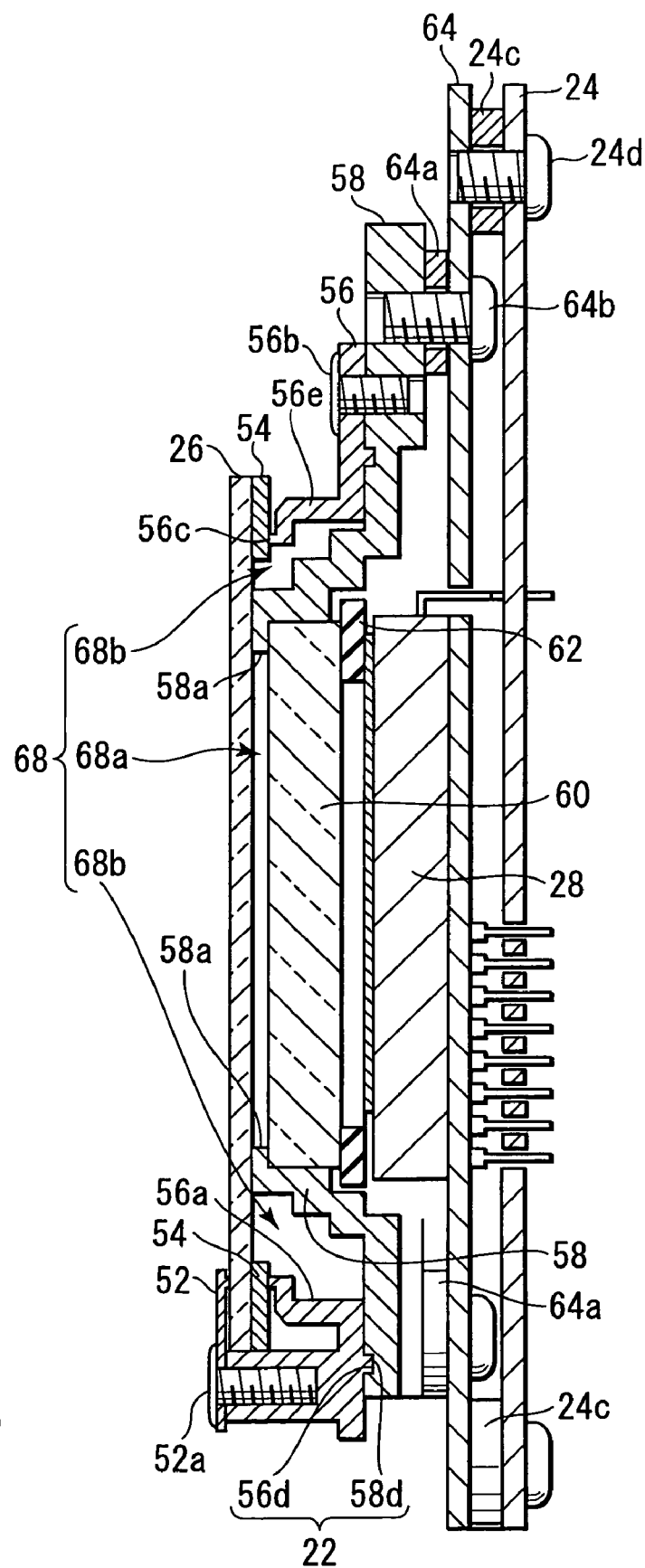
FIG. 5 is a sectional view of the unit, taken along the surface at which the sectional view of FIG. 4 is taken.

FIGS. 3 to 5 are views showing a part of the photographing unit incorporated in the camera 10 according to the present embodiment. FIG. 3 is an exploded perspective view of the photographing unit provided in the camera shown in FIG. 1, depicting the major components of the unit. FIG. 4 is a partially sectional, perspective view of the photographing unit 45 assembled. FIG. 5 is a sectional view of the unit, taken along the surface at which the sectional view of FIG. 4 is taken.

The photographing unit 22 of the camera 10 according to this embodiment is a unit that comprises, as specified above, a plurality of components including the shutter section 20. Nonetheless, only its major components are shown. The shutter section 20 is not illustrated, simplifying the drawings.

To represent the positional relation of the components, FIGS. 3 to 5 depict the main circuit board 24 that is provided near the photographing unit 22. On the board 24 there are mounted imaging element 28 and imaging-system electric circuits. The imaging-system electric circuits are the image-signal processing circuit 24a, the work memory 24b, and the like. The main circuit board 24 is of the type generally used in the conventional cameras and the like. Thus, the board 24 is not described here.

The photographing unit 22 comprises the dust filter 26, the imaging element 28, a pushing member 52, the piezoelectric element 54, a dust-filter holding member 56 (or first member described later), a imaging-element case 58 (or second member described later, hereinafter referred to as "CCD case"), an optical low-pass filter 60 (hereinafter referred to as "optical LPF"), an optical LPF holding member 62, and an imaging-element support plate 64, and the like.

The imaging element 28 is, for example, a CCD or the like. As described above, it generates an image signal that corresponds to the light (i.e., image of the object) applied to its photoelectric conversion surface through the photographing optical system 14a. The imaging element 28 is supported and held by the imaging-element support plate 64.

The optical LPF 60 is arranged near the photoelectric conversion surface of the imaging element 28. It is designed to remove high-frequency components from the object light beam coming through the photographing optical system 14a. The low-pass filter holding member 62 is interposed between the peripheral edges of the optical LPF 60, on one hand, and those of the imaging element 28. It is an elastic member that is shaped like a frame.

The dust-filter holding member (first member) 56 is arranged in front of the CCD case 58. It holds the dust filter 26, contacting the same at the circumferential edge thereof. The CCD case (second member) 58 contains and holds the imaging element 28. It supports the optical LPF 60, contacting the peripheral edges thereof. Further, it is set, at its predetermined part, in firm contact with the dust-filter holding member 56.

The dust-filter holding member 56 supports the dust filter 26, or a dust-shielding member. The dust filter 26 is located near the photoelectric conversion surface of the imaging element 28 and in front of the optical LPF 60. It faces the optical LPF 60 and is spaced from the optical LPF 60 by a predetermined distance.

The piezoelectric element 54 is arranged, surrounding the circumference of the dust filter 26. The piezoelectric element 54 is a means and member for vibrating the dust filter 26 in a specific manner. The piezoelectric element 54 is driven by the dust-filter driving section 36 (see FIG. 2) that is a drive circuit.

The pushing member 52 holds the dust filter 25 in airtight fashion on the dust-filter holding member 56. It is an elastic member such as a leaf spring.

The imaging element 28 is mounted on imaging-element support plate 64, which in turn is mounted on the main circuit board 24. The element 28 is arranged at a predetermined position with respect to the main circuit board 24. As indicated above, the image-signal processing circuit 24a, the work memory 24b and the like are mounted on the main circuit board 24, too. The signal output from the imaging element 28, i.e., the image signal obtained by photoelectric conversion, is supplied to the image-signal processing circuit 24a and the like.

The image-signal processing circuit 24a processes signals in various ways. For example, it converts the image signal generated by the imaging element 28, to a signal of a type that can be recorded. The signal output from the circuit 24a represents the image that the photographing optical system 14a, which is held in the lens barrel 14 held by the photographing optical system coupler 12a, forms on the photoelectric conversion surface of the imaging element 28. This signal processing is similar to one that is usually performed in the ordinary digital camera that processes electric image signals. Hence, how signals are processed in various ways in the camera 10 will not explained in detail.

In front of the imaging element 28, the optical LPF 60 is arranged across the low-pass filter holding member 62. The CCD case 58 covers the imaging element 28, optical LPF 60 and low-pass filter holding member 62.

More specifically, the CCD case 58 has a rectangular opening 58c made in the center part. Into the opening 58c the optical LPF 60 and the imaging element 28 are fitted from back. As FIGS. 4 and 5 show, a step portion 58a is provided in the inner surface of the opening 58c. The step portion 58a lies near the back of the CCD case 58 and has an L-shaped cross section.

As described above, the low-pass filter holding member 62 made of an elastic member or the like is interposed between the optical LPF 60 and the imaging element 28. It is an elastic member that is shaped like a frame. The low-pass filter holding member 62 is arranged at the edges of the front edges of the imaging element 28, at a position outside the effective area of the photoelectric conversion surface of the element 28. The member 62 also abuts on that part of the back of the optical LPF 60 which lies near the edges thereof. Almost airtight sealing is therefore achieved between the optical LPF 60 and the imaging element 28. Thus, the low-pass filter holding member 62 exerts its elastic force on the optical LPF 60 in the optical axis of the optical LPF 60.

The optical LPF 60 is so arranged that its front edges contact the step portion 58a in substantially airtight fashion. This prevents the optical LPF 60 from moving in its optical axis, though the elastic force of the low-pass filter holding member 62 acts to displace the optical LPF 60 in the optical axis thereof.

In other words, the optical LPF 60, which is inserted from back into the opening 58c of the CCD case 58, is held by the step portion 58a in a specific position in the optical axis. Therefore, the optical LPF 60 would not be pulled from the CCD case 58 toward the front.

Thus, the imaging element 28 is arranged on the back of the optical LPF 60 after the optical LPF 60 is inserted from back into the opening 58c of the CCD case 58. In this case, the low-pass filter holding member 62 has its edges held between the optical LPF 60 and the imaging element 28.

As specified above, the imaging element 28 is mounted on the main circuit board 24, with the imaging-element support plate 64 held between the element 28 and the main circuit board 24. The imaging-element support plate 64 is fastened to the back of the CCD case 58, with spacers 64a interposed between it and the CCD case 58, by means of screws 58b that pass through screw holes 58e. The main circuit board 24 is fastened to the imaging-element support plate 64 by screws 24d that pass through spacers 24c.

The dust-filter holding member 56 is secured to the front of the CCD case 58 with screws 56b that pass through screw holes 58b. In this case, the CCD case 58 has an almost annular groove 58d cut in the front and located near the edges as is illustrated in FIGS. 4 and 5. On the other hand, an annular projection 56d (not shown in FIG. 3) is formed on the back of the dust-filter holding member 56, located at a predetermined position and aligned with the annular groove 58d of the CCD case 58. The annular projection 56d is fitted in the annular groove 58d. Therefore, the CCD case 58 and the dust-filter holding member 56 are coupled to each other substantially in airtight fashion at the annular region that is defined by the annular groove 58d and the annular projection 56d.

The dust filter 26 is a plate that is circular or polygonal as a whole. It has a transparent part that extends from the center for a specific distance in the radial direction. The transparent part is positioned, opposing the front of the optical LPF 60a and spaced therefrom by a prescribed distance.

The piezoelectric element 54 is arranged on one side (or back in this embodiment) of the dust filter 26, or on the circumferential edge of the dust filter 26. The element 54 is, for example, bonded to the dust filter 26 with an adhesive and is formed integral therewith. The dust-filter driving section 36 may apply a drive voltage of a predetermined frequency to the piezoelectric element 54. The piezoelectric element 54 then vibrates the dust filter 26 at a specific frequency. That is, the dust filter 26 undergoes standing-wave vibration.

The pushing member 52 holds the dust filter 26 is held in place and in airtight fashion with the dust-filter holding member 56.

The dust-filter holding member 56 has an opening 56f, which is made in the center part and which is circular or polygonal. The opening 56f is so large that the object light beam can pass to illuminate the photoelectric surface of the imaging element 28 that is arranged at the back of the member 56.

An annular wall 56e (see FIGS. 4 and 5) is formed on the circumferential edge of the opening 56f and projects toward the front. A holding portion 56c is formed on the tip of the wall 56e and projects toward the front, too.

On the front of the dust-filter holding member 56, a plurality of projections 56a (three projections in this embodiment) protrude forwards from predetermined positions near the edges of the member 56. The projections 56a are members to which the pushing member 52 is fastened to hold the dust filter 26. The pushing member 52 is fastened to the tips of the projections 56a by fastening means such as a screw 52a or the like.

As pointed out earlier, the pushing member 52 is an elastic member such as a leaf spring. Its proximal end is secured to one projection 56a, and its free end abuts on the circumferential edge of the dust filter 26. The pushing member 52 therefore pushes the dust filter 26 onto the dust-filter holding member 56. That is, the member 52 pushes the filter 26 in the direction of the optical axis.

In this case, the piezoelectric element 54 that is arranged on the back of the circumferential edge of the dust filter 26 abuts, at a prescribed part, on the holding portion 56c. Thus, the dust filter 26 and the piezoelectric element 54 assume specific positions with respect to the optical axis. The dust filter 26 is therefore fastened in airtight fashion to the dust-filter holding member 56, with the piezoelectric element 54 interposed between it and the member 56.

In other words, the dust-filter holding member 56 is fastened to the dust filter 26 in airtight fashion, via the piezoelectric element 54, owning to the bias of the pushing member 52.

As mentioned above, the annular projection 56d of the dust-filter holding member 56 is fitted in the annular groove 58d of the CCD case 58, substantially in airtight fashion (see FIGS. 4 and 5). Further, the bias of the pushing member 52 fastens the dust-filter holding member 56 and the dust filter 26 together, clamping the piezoelectric element interposed between the member 56 and the filter 26.

The optical LPF 60 provided in the CCD case 58 is arranged almost airtight at its front edges, at the step portion 58a of the CCD case 58. The imaging element 28 is fastened to the back of the optical LPF 60, with the low-pass filter holding member 62 interposed between the imaging element 28 and the optical LPF 60. Thus, substantially airtight sealing is achieved between the optical LPF 60 and the imaging element 28.

A prescribed space 68a is therefore provided between the optical LPF 60 and the dust filter 26 that faces the optical LPF 60. Further, a space 68b is provided at the edges of the optical LPF 60, defined by the CCD case 58, dust-filter holding member 56 and dust filter 26. This space 68b is a closed space that extends outside the optical LPF 60 (see FIGS. 4 and 5). The space 68b is larger than the space 68a. The spaces 68a and 68b constitute a closed space 68 that is substantially airtight. The space 68 is defined by the CCD case 58, dust-filter holding member 56, dust filter 26 and optical LPF 60, as is described above.

The photographing unit 22 of the camera according to the present embodiment has a sealed structure providing a space 68 that is almost closed and includes a space 68a provided at the edges of the optical LPF 60 and dust filter 26. The sealed structure is located at, near and outside the edges of the optical LPF 60.

In this embodiment, the sealed structure is constituted by the dust-filter holding member 56, i.e., first member, and the CCD case 58, i.e., second member. The dust-filter holding member 56 supports the dust filter 26 at the edges thereof. The CCD case 58 supports the optical LPF 60 at the edges thereof and contacts, at its specific parts, the dust-filter holding member 56 (first member).

In the camera according to this embodiment, which is constructed as specified above, the dust filter 26 is arranged at a predetermined position in front of the imaging element 28. The dust filter 26 therefore closes the space 68 that is provided at the edges of the photoelectric conversion surface of the imaging element 28 and at the edges of the dust filter 26. Thus, the dust filter 26 prevents dust and the like from sticking to the photoelectric conversion surface of the imaging element 28.

In the embodiment, a voltage of a predetermined frequency is applied to the piezoelectric element 54 that is formed integral with the circumferential edge of the dust filter 26. The dust filter 26 is thereby vibrated at the predetermined frequency. The dust and the like on the exposed front of the dust filter 26 are therefore removed.

Figure 6:
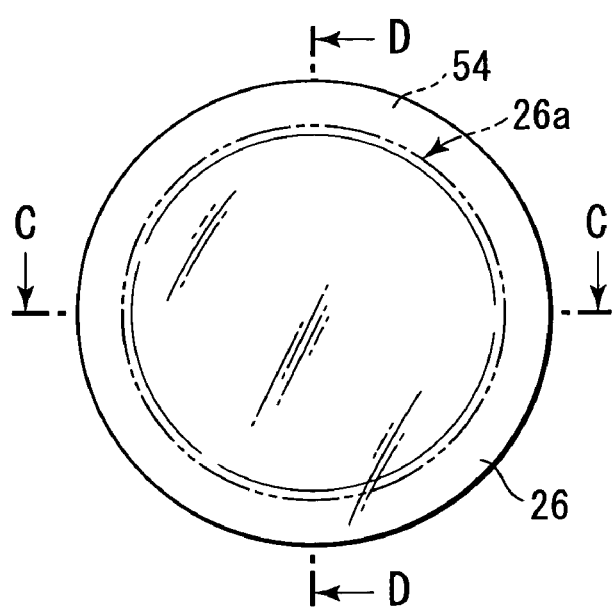
FIG. 6 is a front view of only the dust filter and piezoelectric element of the photographing unit provided in the camera of FIG. 1, said element formed integral with the filter.
Figure 8:
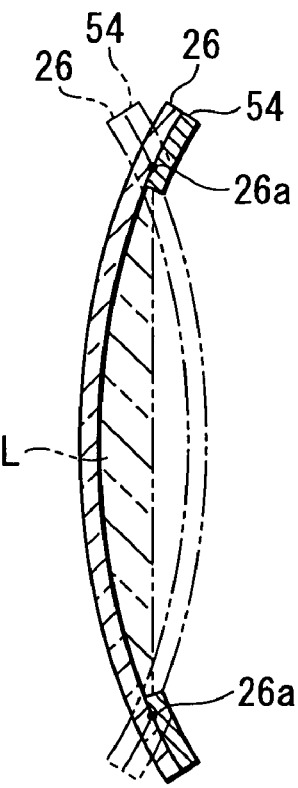
FIG. 8 is a sectional view taken along line D-D in FIG. 6, showing how the dust filter and piezoelectric element change in state when a voltage is applied to the piezoelectric element shown in FIG. 6.
Figure 7:
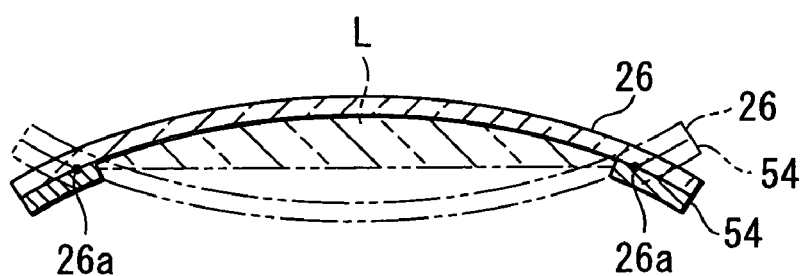
FIG. 7 is a sectional view taken along line C-C in FIG. 6, displaying how the dust filter and piezoelectric element change in state when a voltage is applied to the piezoelectric element shown in FIG. 6.

FIG. 6 is a front view of only the dust filter 26 and piezoelectric element 54 of the photographing unit 22 provided in the camera 10, said element 54 being formed integral with the filter 26. FIGS. 7 and 8 show how the dust filter 26 and piezoelectric element 54 change in state when a voltage is periodically applied to the piezoelectric element 54 shown in FIG. 6. More precisely, FIG. 7 is a sectional view taken along line C-C shown in FIG. 6, and FIG. 8 is a sectional view taken along line D-D in FIG. 6.

When a negative voltage (minus; −), for example, is applied to the piezoelectric element 54, the dust filter 26 is deformed as solid lines indicates in FIGS. 7 and 8. When a positive voltage (plus; +) is applied to the piezoelectric element 54, the dust filter 26 is deformed as two-dot, dashed lines show in FIGS. 7 and 8. As the dust filter 26 is so deformed, the space 68a between the optical LPF 60 and the dust filter 26 increases (or decreases) in the range <L shaded in FIGS. 7 and 8.

The amplitude is zero in effect at the nodes of vibration, which are designated as "26a" in FIGS. 6 to 8. In view of this, the holding portion 56c of the dust-filter holding member 56 is positioned, abutting on those parts of the dust filter 26 which correspond to the nodes 26a. Thus, the member 56 can effectively hold the dust filter 26, without restricting the vibration of the dust filter 26.

In this condition, the dust-filter driving section 36 is controlled at a prescribed time, applying a voltage of the predetermined frequency to the piezoelectric element 54. The element 54 vibrates the dust filter 26, from which the dust and the like are removed.

The resonance frequency at this time is determined by the shape, thickness and material and the like of the dust filter 26. In the case illustrated in FIGS. 6 to 8, the dust filter undergoes primary vibration.

Figure 9:
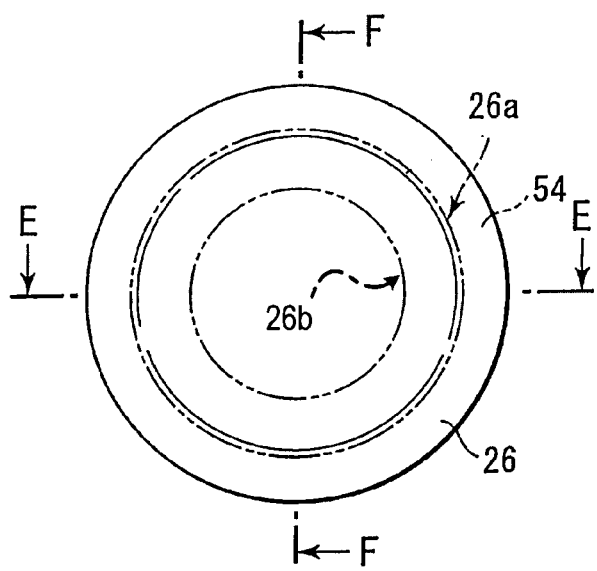
FIG. 9 is a front view of the dust filter and piezoelectric element of the photographing unit provided in the camera of FIG. 1, showing the state that the filter and element assume when they undergo secondary vibration.
Figure 11:
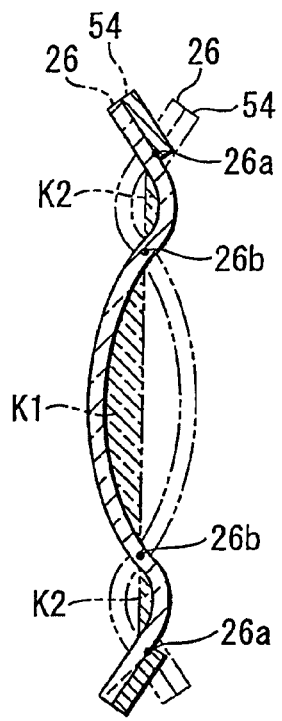
FIG. 11 is a sectional view taken along line F-F in FIG. 9, illustrating how the dust filter and piezoelectric element change in state in another manner when a voltage is applied to the piezoelectric element shown in FIG. 9.
Figure 10:
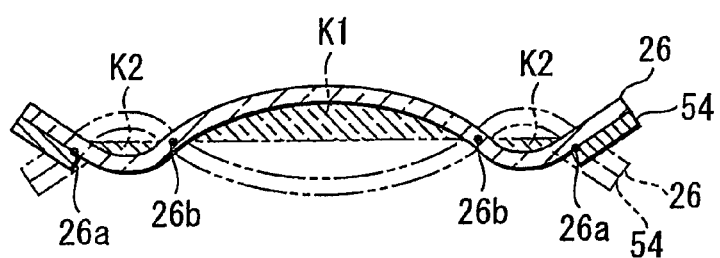
FIG. 10 is a sectional view taken along line E-E in FIG. 9, illustrating how the dust filter and piezoelectric element change in state when a voltage is applied to the piezoelectric element shown in FIG. 9.

In another case illustrated in FIGS. 9 to 11, a dust filter identical to the filter 26 shown in FIGS. 6 to 8 undergoes secondary vibration.

Like FIG. 6, FIG. 9 is a front view of the dust filter 26 and piezoelectric element 54 of the photographing unit 22 provided in the camera 10. of FIG. 1, said element 54 formed integral with the dust filter 26. FIGS. 10 and 11 show how the dust filter 26 and piezoelectric element 54 change in state when a voltage is periodically applied to the piezoelectric element 54 shown in FIG. 9. FIG. 10 is a sectional view taken along line E-E shown in FIG. 9, and FIG. 11 is a sectional view taken along line F-F in FIG. 9.

When a negative voltage (minus; −), for example, is applied to the piezoelectric element 54, the dust filter 26 is deformed as solid lines indicates in FIGS. 10 and 11. When a positive voltage (plus; +) is applied to the piezoelectric element 54, the dust filter 26 is deformed as two-dot, dashed lines show in FIGS. 10 and 11. As the dust filter 26 is so deformed, the space 68a between the optical LPF 60 and the dust filter 26 increases (or decreases) as is indicated by shaded regions K1 and K2 shown in FIGS. 10 and 11.

In this case, there are two pairs of nodes, i.e., two nodes 26a and two nodes 26b as illustrated in FIGS. 9 to 11. In view of this, the holding portion 56c of the dust-filter holding member 56 is positioned, abutting on those parts of the dust filter 26 which correspond to the nodes 26a. Thus, the member 56 can effectively hold the dust filter 26, without restricting the vibration of the dust filter 26, in the same way as in the case illustrated in FIGS. 6 to 8.

In this dust-shielding mechanism, the dust-filter driving section 36 is controlled at the prescribed time, applying a voltage of the predetermined frequency to the piezoelectric element 54. The element 54 therefore vibrates the dust filter 26. The dust and the like can thereby removed from the surfaces of the dust filter 26.

The primary vibration and the secondary vibration, both mentioned above, cooperate to change the manner of removing the dust. That is, the mode of vibrating the dust filter 26 is changed so that the dust may be removed more efficiently than otherwise.

It will be discussed how the dust is removed when the dust filter 26 is vibrated at, for example, two different frequencies.

When the dust filter 26 undergoes primary vibration at a low frequency, the amplitude is large and the acceleration is low no matter whether the vibration is standing-wave vibration or traveling-wave vibration. In this case, there is the tendency that, of the dust particles of the dust sticking to the dust filter 26, relatively heavy ones can be moved for a long distance.

On the other hand, the amplitude is small and the acceleration is high when the dust filter 26 undergoes primary vibration at a high frequency. In this case, there is the tendency that relatively light particles of the dust on the dust filter 26 can be easily moved.

The dust and the like can therefore be more effectively removed when the dust filter 26 undergoes vibrations of different orders, i.e., primary vibration and secondary vibration, than when the dust filter 26 undergoes vibration of the same frequency within a predetermined time.

In the case of standing-wave vibration, there are a few nodes of vibration if the frequency is low. The higher the frequency, the greater the number of nodes. It is known that the dust and the like can fall off at a time from a large area if the dust filter is vibrated at low frequency.

An example of the sequence of removing dust in a camera according to one embodiment of this invention will be explained, with reference to the flowchart of FIG. 12.

FIG. 12 is a diagram for explaining this example of the sequence of removing dust in the camera according to an embodiment of the invention. It is a flowchart explaining the first example of the dust-removing sequence.

In the first example shown in the flowchart of FIG. 12, the dust filter 26 is vibrated in two modes in the sequence of removing dust, or undergoes two types of vibrations to remove dust from it.

The process of removing dust, which will be described below, is carried out under the control of the CPU 30. The process is performed at specific timing, for example when the photographing optical system 14a (held in the lens barrel 14) is replaced with another while the camera 10 is being used.

The sequence of removing dust will be described with reference to the flowchart of FIG. 12.

In step S1, the CPU 30 sets a first drive frequency at which the dust-filter driving section 36 is to apply a voltage to the piezoelectric element 54 to drive the element 54. The first drive frequency is equal to the resonance frequency that causes the dust filter 26 to undergo primary vibration (see FIGS. 6 to 8).

In step S2, the CPU 30 outputs a control signal to the dust-filter driving section 36 so that the dust filter 26 may be vibrated at the first vibration frequency set in step S1. Upon receiving the control signal, the dust-filter driving section 36 applies a predetermined voltage to the piezoelectric element 54. The dust filter 26 therefore undergoes primary vibration at the first vibration frequency.

Thereafter, in step S3, the time-measuring means (timer, not shown) incorporated in the CPU 30 starts measuring time and stops doing so upon lapse of a predetermined time of, for example, 200 ms (milliseconds). Thus, the dust filter 26 undergoes the primary vibration until the predetermined time (200 ms) passes. The time set here is an appropriate one that has been determined by the characteristics of the dust filter 26. When the predetermined time elapses, or when the count of the timer reaches the preset value, the sequence goes to the next step S4.

In step S4, the CPU 30 sets a second drive frequency at which the dust-filter driving section 36 is to apply a voltage to the piezoelectric element 54. The second drive frequency is equal to the resonance frequency that causes the dust filter 26 to undergo secondary vibration (see FIGS. 9 to 11). The sequence then goes to step S5.

In step S5, the CPU 30 outputs a control signal to the dust-filter driving section 36 so that the dust filter 26 may be vibrated at the second vibration frequency set in step S4. Upon receiving the control signal, the dust-filter driving section 36 switches the drive frequency, from the first drive frequency to the second drive frequency. The section 36 then applies the predetermined voltage to the piezoelectric element 54. The dust filter 26 therefore undergoes secondary vibration at the second vibration frequency. The sequence then goes to step S6.

In step S6, the timer (not shown) incorporated in the CPU 30 starts measuring time and stops doing so upon lapse of a predetermined time of, for example, 100 ms (milliseconds). Thus, the dust filter 26 undergoes the secondary vibration until this predetermined time (100 ms) passes. The time set is an appropriate one that has been determined by the characteristics of the dust filter 26. When the predetermined time elapses, or when the count of the timer reaches the preset value, the sequence goes to the next step S7.

In step S7, the CPU 30 outputs a control signal so that the dust-filter driving section 36 may stop applying the voltage to the piezoelectric element 54. Upon receiving this control signal, the dust-filter driving section 36 stops applying the voltage to the piezoelectric element 54. The sequence of removing dust is thereby completed.

In the first dust-removing sequence illustrated in the flowchart of FIG. 12, the dust filter 26 first undergoes primary vibration for a predetermined time (i.e., 200 milliseconds), thereby removing relatively large particles of dust and the like from the surface of the dust filter 26. The dust filter 26 then undergoes secondary vibration for a predetermined time (i.e., 100 milliseconds), thus removing relatively small particles of dust and the like from the surface of the dust filter 26.

The first example is advantageous in that dust particles of various sizes can be removed more reliably and quickly than in the case where only primary vibration or secondary vibration is carried out for a long time.

The concept of the first example described above may be extended to another example, which will be described below.

FIG. 13 is a flowchart explaining another, or second sequence of removing dust in the camera according to one embodiment of the present invention.

In the second example shown in FIG. 13, the dust filter 26 is vibrated in various modes used in combination to remove dust from the dust filter 26. More specifically, vibrations of higher orders, such as third-order vibration and fourth-order vibration, are performed in addition the vibrations carried out in the first example, thereby to remove dust.

The third-order vibration is a mode of vibration, in which three nodes of vibration develop in concentric circles in the plane of the dust filter 26. The fourth-order vibration is a mode of vibration, in which four nodes of vibration develop in concentric circles in the plane of the dust filter 26. (See FIG. 9 that illustrates secondary vibration.)

The second example, or the second sequence of removing dust, will be explained with reference to the flowchart of FIG. 13.

First, in step S11, the counting means (hereinafter referred to as "counter," not shown) incorporated in the CPU 30 is set to a count value n=1 (initial value). The count value n represents the order of the vibration to be performed. Then, the sequence goes to step S12.

In step S12, the CPU 30 sets the frequency at which the dust filter 26 should be vibrated, on the basis of the count value n set in the counter in step S11. That is, the CPU 30 sets a predetermined frequency for the voltage that the dust-filter driving section 36, i.e., a circuit for driving the piezoelectric element 54, should apply to the piezoelectric element 54.

If the count value n is 1 (n=1), a resonance frequency that makes the dust filter 26 undergo primary vibration (see FIGS. 6 to 8) is set. If the count value n is 4 (n=4), a resonance frequency that makes the dust filter 26 undergo fourth-order vibration is set. Then, the sequence goes to step S13.

In step S13, the CPU 30 outputs a control signal to the dust-filter driving section 36 so that the dust filter 26 may be vibrated at the frequency set in step S12. Upon receiving the control signal, the dust-filter driving section 36 applies a predetermined voltage to the piezoelectric element 54. Therefore, the dust filter 26 starts undergoing the nth-order vibration. The sequence then goes to step S14.

In step S14, the time-measuring means (timer, not shown) incorporated in the CPU 30 starts measuring time and stops doing so upon lapse of a predetermined time of, for example, 100 ms (milliseconds). Thus, the dust filter 26 undergoes the nth-order vibration until the predetermined time (100 ms) passes. The time set here is an appropriate one that has been determined by the characteristics of the dust filter 26. When the predetermined time elapses, or when the count of the timer reaches the preset value, the sequence goes to the next step S15.

In step S15, the count value of the counter provided in the CPU 30 is increased by "1" (n←n+1). Thereafter, the sequence goes to step S16.

In step S16, the CPU 30 determines whether the count value n that the counter has at this time is 5 (n=5). If the count value n is not 5, the sequence returns to step S12. In step S12, the process of causing vibration of a higher order is repeated.

If it is determined in step S16 that the count value n is 5 (n=5), the sequence goes to the next step S17.

In the second example, the count value is set at 5 (n=5) in order to perform four vibrations of different orders, i.e., the primary to fourth-order vibrations, may be performed on the dust filter 26.

In step S17, the CPU 30 outputs a control signal so that the dust-filter driving section 36 may stop applying the voltage to the piezoelectric element 54. Upon receiving this control signal, the dust-filter driving section 36 stops applying the voltage to the piezoelectric element 54. Thus, the sequence of removing dust is completed.

In the second example shown in FIG. 13, or second sequence of removing dust, a control is performed to switch the mode of vibrating the dust filter 26, from a lower-order vibration to a higher-order one and then to a still higher-order one. Namely, the dust filter 26 undergoes four types of vibrations, i.e., the primary vibration to the fourth-order vibration. Therefore, the dust and the like can be reliably removed from the surface of the dust filter 26, regardless of the size of the dust particles.

As described above, the frequency of the voltage applied to the piezoelectric element 54 is equal to the resonance frequency of the dust filter 26. Nonetheless, the resonance frequency of the dust filter 26 may deviate from the design value. If this is the case, the dust or the like cannot be removed as is desired when the filter 26 is vibrated at the design frequency.

In view of this, the resonance frequency of the dust filter 26 may be measured in the process of assembling the camera 10 and stored on the non-volatile memory element (not shown), such as an EEPROM, incorporated in the CPU 30. In preparation for the removal of dust from the filter 26, the voltage to be applied to the piezoelectric element 54 is set at the frequency based on the resonance frequency stored in the memory. This solves the problem specified above.

The resonance frequency of the dust filter 26 may change due to changes in the use conditions of the camera 10, such as the difference between the temperature of the camera and the ambient temperature and the aging of the components, such as piezoelectric element 54 and dust filter 26.

In view of this, the resonance frequency of the dust filter 26 may be measured before dust is removed from the filter 26, at any given time, for example when the power-supply switch to the camera 10 is closed to use the camera 10. The resonance frequency thus measured may be stored in the EEPROM (not shown) and be used to determine the frequency for the voltage to be applied to the piezoelectric element 54 to remove the dust from the filter 26. Then, the piezoelectric element 54 can be vibrated to remove the dust from it, in spite of a deviation, if any, of the resonance frequency of the dust filter 26.

In the first and second sequences of removing dust, the vibration of the lowest order is first performed and the vibrations of higher order are then carried out one after another. Nonetheless, vibrations of various orders may be performed in a different order to attain the same advantage.

In the third and fourth examples, which will be described below, the vibration of the highest order is carried out first and the vibrations of lower orders are performed one after another.

Figure 14:
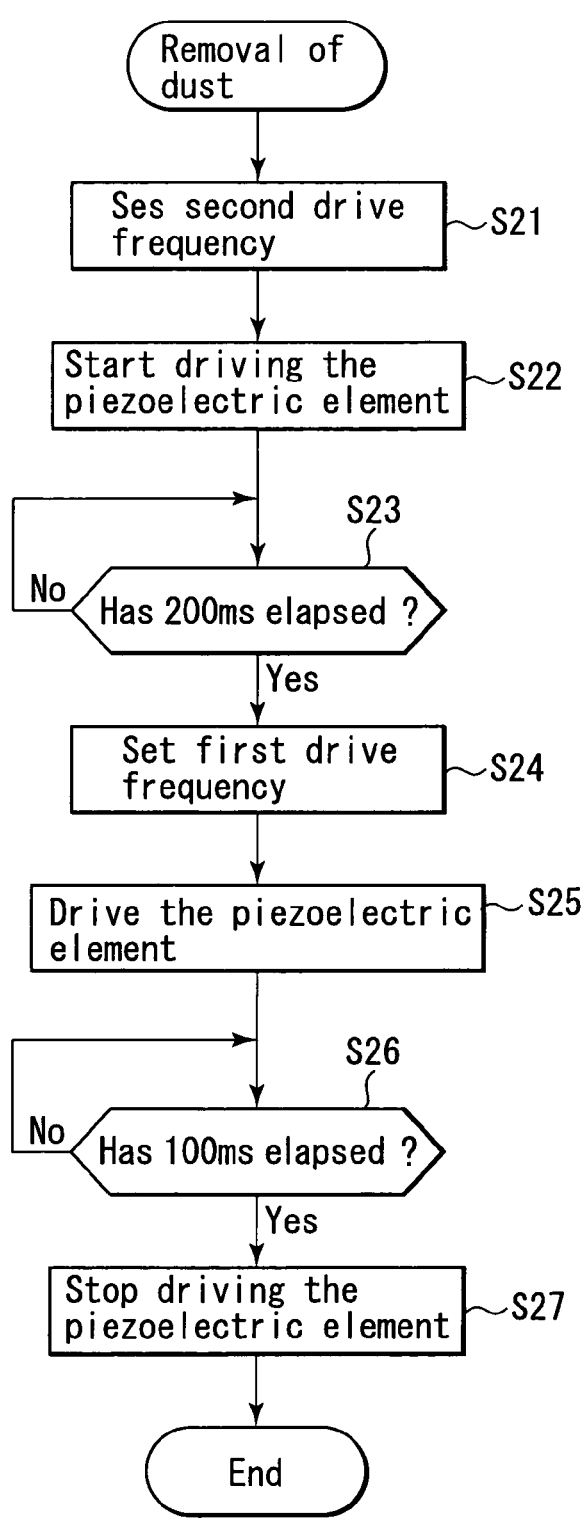
FIG. 14 is a flowchart explaining a further, or third sequence of removing dust in the camera of FIG. 1.

FIG. 14 is a flowchart explaining the third sequence of removing dust in the camera according to one embodiment of the present invention.

In the third example illustrated in the flowchart of FIG. 14, secondary vibration is first carried out and primary vibration is then performed. As in the first example, the dust filter 26 is vibrated in two modes in the third example, in order to remove dust from the dust filter 26. Thus, the flow of the sequence is similar to that of the first example (see FIG. 12). Only the steps different from those of the first example will be described below in detail.

First, in step S21, the CPU 30 sets a second drive frequency at which the dust-filter driving section 36 is to apply a voltage to the piezoelectric element 54 to drive the element 54. Step 21 is similar to step S4 shown in the flowchart of FIG. 12. The sequence goes to step S22.

Step 22 and step 23 are almost identical to steps 2 and 3 shown in the flowchart of FIG. 12.

Next, in step S24, the CPU 30 sets a first drive frequency at which the dust-filter driving section 36 is to apply a voltage to the piezoelectric element 54. Step 24 is similar to step S1 shown in the flowchart of FIG. 12. The sequence goes to step S25.

Steps S25 to S27 are substantially identical to steps S5 to S7 shown in the flowchart of FIG. 12. Thus, in step S27, the sequence of steps terminates in step S27.

As indicated above, in the third example illustrated in the flowchart of FIG. 14, secondary vibration is performed for a predetermined time (200 milliseconds) to remove dust. Then, primary vibration is effected for a predetermined time (100 milliseconds) to remove the dust.

Since the operation is thus controlled, the dust filter 26 first undergoes secondary vibration. As a result, dust particles move, approaching the two nodes of secondary vibration. When the dust filter 26 undergoes primary vibration in this condition, the dust and the like can fall, at a time, from those parts of the dust filter 26 which lie at the two nodes of secondary vibration.

Figure 15:
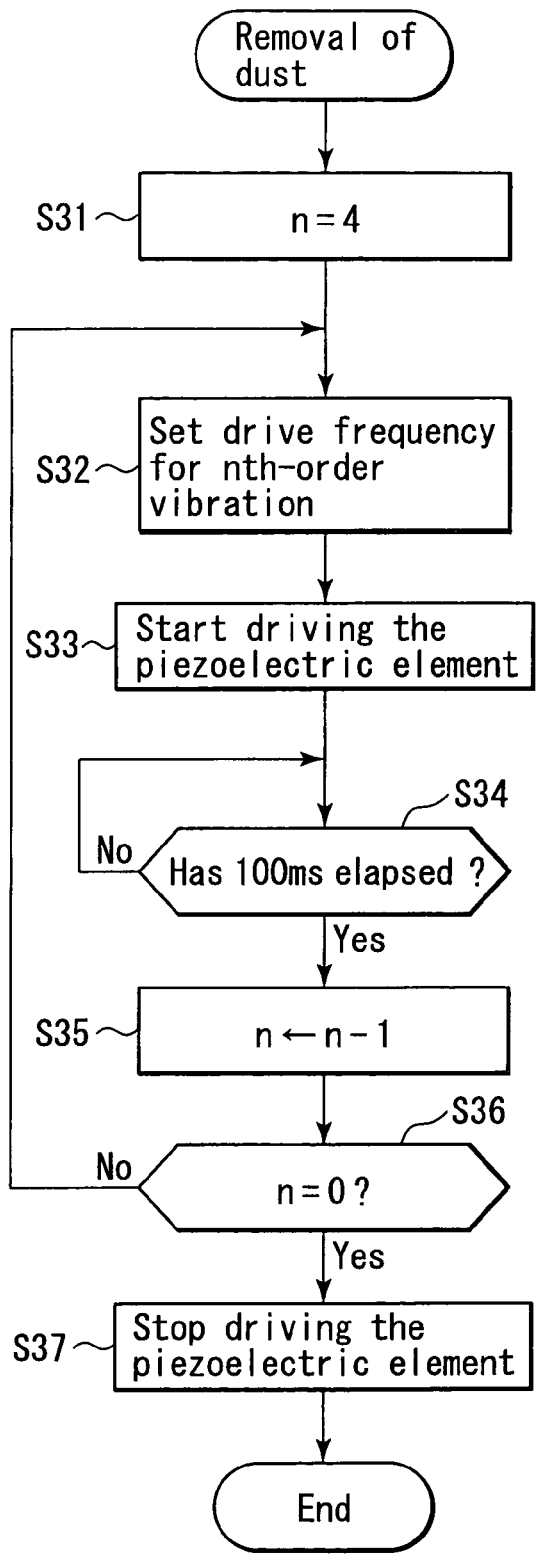
FIG. 15 is a flowchart explaining still another, or fourth sequence of removing dust in the camera of FIG. 1.

FIG. 15 is a flowchart explaining the fourth sequence of removing dust in the camera according to one embodiment of the present invention.

In the fourth example shown in the flowchart of FIG. 15, the dust filter 26 is vibrated in various modes used in combination to remove dust. More precisely, vibrations of higher orders, such as third-order vibration and fourth-order vibration, are performed in addition the vibrations carried out in the third example, thereby to remove dust. Thus, the flow of the sequence is similar to that of the second example (see FIG. 13). Only the steps different from those of the second example will be described below in detail.

First, in step S31, the counting means (hereinafter referred to as "counter," not shown) incorporated in the CPU 30 is set to a count value n=4 (initial value). Step S31 is substantially identical to step S11 shown in the flowchart of FIG. 13. The sequence goes to step S32. Steps S32 to S34 are similar to steps S12 to S14 of the flowchart illustrated in FIG. 13.

In step S35, the count value of the counter provided in the CPU 30 is decreased by "1" (n←n−1). Step S35 is similar to the step S15 shown in the flowchart of FIG. 13. Thereafter, the sequence goes to step S36.

In step S36, the CPU 30 determines whether the count value n that the counter has at this time is 0 (n=0). If the count value n is not 0, the sequence returns to step S32. In step S32, the process of causing vibration of a lower order is repeated. If it is determined in step S36 that the count value n is 0 (n=0), the sequence goes to the next step S37. Step S36 is similar to step S16 shown in the flowchart of FIG. 13.

Thereafter, the sequence goes to step S37. The sequence of removing dust is completed in step S37.

In the fourth example illustrated in FIG. 15, the dust filter 26 is first vibrated at the highest frequency. The higher the vibration frequency, the greater the number of vibration nodes and the shorter the distance between the vibration nodes. Hence, large particles of dust gather neat the vibration nodes.

Since the vibration frequency is gradually reduced, dust particles and the like are collected at the respective nodes of vibration. Finally, large dust balls are formed at the vibration nodes, respectively. The dust balls are made to fall, at a time, from the dust filter 26. Thus, the dust and the like can be more reliably removed from the dust filter 26.

As has been described, the embodiment of the invention has a dust-shielding mechanism in which the dust filter 26 is arranged at a specific position at the photoelectric conversion surface of the imaging element 28 and is vibrated so that dust and the like are removed from its surface. The dust filter 26 is vibrated in such a specific mode that the dust and the like can be removed more reliably and quickly from the surface of the filter 26.

The present invention can provide a camera in which dust and the like are prevented from sticking to the photoelectric conversion surface of the imaging element and which has means for removing dust or the like from the surface of the dust-shielding member. In the camera, dust can be removed reliably and quickly from the surface of the dust-shielding member.

What is claimed is:

1. A photographing device provided with a dust removing mechanism comprising:
a photoelectric conversion element which converts an optical image into an electric signal;
an optical element arranged in a light path of the photoelectric conversion element;
a piezoelectric element provided at a peripheral portion of the optical element;
a drive circuit which supplies a drive signal to the piezoelectric element to drive the piezoelectric element; and
a control circuit which causes the piezoelectric element to vibrate via the drive circuit, to thereby cause flexural standing wave vibration in the optical element, the control circuit being configured to cause at least two flexural standing wave vibrations in the optical element at different nodes of vibration sequentially for predetermined time periods which are determined in accordance with characteristics of the optical element by changing control modes with time.

2. The photographing device according to claim 1, wherein the control circuit causes the piezoelectric element to vibrate at a frequency corresponding to a resonance frequency of the optical element, to thereby cause flexural standing wave vibration in the optical element.

3. The photographing device according to claim 2, wherein the control circuit changes a frequency at which the piezoelectric element vibrates, to thereby cause at least two flexural standing wave vibrations in the optical element.

4. The photographing device according to claim 1, wherein the flexural standing wave vibration has an amplitude of vibration in a direction perpendicular to an optical element surface of the optical element.

5. The photographing device of claim 1, wherein the characteristics of the optical element include at least a shape of the optical element.

6. The photographing device of claim 1, wherein the characteristics of the optical element include at least a thickness of the optical element.

7. The photographing device of claim 1, wherein the characteristics of the optical element include at least a material of the optical element.

8. A control method for a photographing device provided with a dust removing mechanism which removes dusts from an optical element arranged in a photographing light path, the method comprising:
generating a first flexural standing wave vibration in the optical element for a first predetermined time period which is determined in accordance with characteristics of the optical element; and
generating a second flexural standing wave vibration different from the first flexural standing wave vibration for a second predetermined time period which is determined in accordance with characteristics of the optical element, to remove dusts from a position corresponding to a node of the first flexural standing wave vibration.

9. The control method according to claim 8, wherein the second flexural standing wave vibration is generated in the position corresponding to the node of the first flexural standing wave vibration.

10. The control method of claim 8, wherein the characteristics of the optical element include at least a shape of the optical element.

11. The control method of claim 8, wherein the characteristics of the optical element include at least a thickness of the optical element.

12. The control method of claim 8, wherein the characteristics of the optical element include at least a material of the optical element.

* * * * *